United States Patent [19]
Gotoh et al.

[11] Patent Number: 5,132,152
[45] Date of Patent: Jul. 21, 1992

[54] OPTICAL RECORDING MEDIUM AND METHOD FOR MANUFACTURING THE SAME

[75] Inventors: Akira Gotoh, Toride; Eiji Koyama, Tsuchiura; Shuhei Nakamichi, Ibaraki, all of Japan

[73] Assignee: Hitachi Maxell, Ltd., Osaka, Japan

[21] Appl. No.: 540,787

[22] Filed: Jun. 20, 1990

[30] Foreign Application Priority Data

Jun. 21, 1989 [JP] Japan .................... 1-156879
Nov. 22, 1989 [JP] Japan .................... 1-301953

[51] Int. Cl.$^5$ ............................... B32B 3/02
[52] U.S. Cl. ............................... 428/64; 428/65; 428/212; 428/411.1; 428/913; 346/762; 346/135.1; 369/288; 430/945
[58] Field of Search ............... 428/64, 65, 212, 411.1, 428/913; 369/288; 346/762, 135.1; 430/495, 945

[56] References Cited

U.S. PATENT DOCUMENTS

| | | | |
|---|---|---|---|
| 4,271,256 | 6/1981 | Kido et al. | 430/495 |
| 4,638,335 | 1/1987 | Smith et al. | 430/945 |
| 4,686,143 | 8/1987 | Yoshikawa et al. | 428/411.1 |
| 4,716,063 | 12/1987 | Uehara et al. | 428/65 |
| 4,798,781 | 1/1989 | Hirose et al. | 430/270 |
| 4,852,077 | 7/1989 | Clark et al. | 430/945 |
| 4,871,601 | 10/1989 | Miura et al. | 428/913 |
| 4,920,359 | 4/1990 | Arai et al. | 430/945 |
| 4,965,153 | 10/1990 | Imataki et al. | 430/945 |

FOREIGN PATENT DOCUMENTS

| | | |
|---|---|---|
| 0072017 | 2/1983 | European Pat. Off. . |
| 6055532 | 9/1983 | Japan . |
| 0292683 | 4/1990 | Japan . |

Primary Examiner—Patrick J. Ryan
Assistant Examiner—Elizabeth Evans
Attorney, Agent, or Firm—Birch, Stewart, Kolasch & Birch

[57] ABSTRACT

Disclosed is an optical recording medium comprising a transparent substrate, a transferred layer of preformat pattern formed on one side of the transparent substrate, and a recording layer laminated on the preformat patterns formed on the surface of the transferred layer, wherein the transferred layer is composed of a three-layer structure with a first layer composed of a first organic compound layer composed of a first organic compound simple substance, a mixed layer composed of a mixture of the first and a second organic compound, and a second organic compound layer composed of a second organic compound simple substance, layered in the above order from the transparent substrate and a method for manufacturing the optical recording medium.

16 Claims, 6 Drawing Sheets

| CONTENT PERCENTAGE OF CELLULOSE NITRATE (%) | 90 | 91 | 92 | 93 | 94 | 95 | 96 | 97 | 98 | 99 | 100 |
|---|---|---|---|---|---|---|---|---|---|---|---|
| EXFOLIATING PROPERTY | ○ | ○ | ○ | ○ | ○ | ○ | X | X | X | X | X |

FIG. 12

OPTICAL RECORDING MEDIUM AND METHOD FOR MANUFACTURING THE SAME

BACKGROUND OF THE INVENTION

1. FIELD OF THE INVENTION

This invention relates to an optical recording medium for recording data by using an optical method and method for manufacturing the same.

2. DISCUSSION OF RELATED ART

There are known optical recording medium made by laminating a recording layer on the top of the surface of a preformat pattern of a transferred layer, wherein the transferred layer of the preformat pattern made of organic compound is adhered on one side of a transparent substrate.

Figure 13:
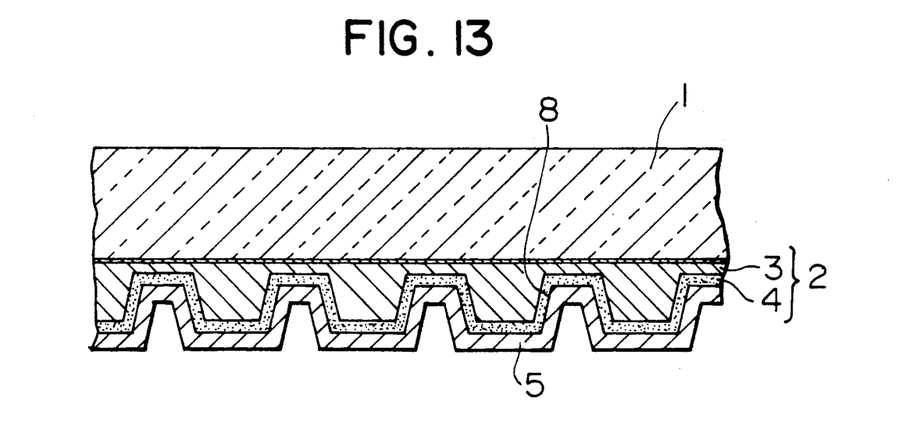
FIG. 13 is a cross-sectional view of the main part of an optical recording medium according to the prior art.

FIG. 13 is a cross-sectional view of the layered structure of an optical disc as an embodiment of the optical recording medium, which is the subject of the present invention, wherein transferred layer 2 of the preformat pattern formed on one side of the transparent substrate 1 is made of, a first organic compound layer 3 comprised of a curing resin such as, for example a photo curing resin or the like and, a second organic compound layer 4 comprised of a material such as, for example, cellulose nitrate or the like, and recording layer 5 is laminated on the surface of the second organic compound layer 4.

Also, as a method for manufacturing such an optical recording medium, there is known a method of transferring the reversed pattern (preformat pattern) of a signal patterned surface formed on a stamper on the first and the second organic compound by the method of applying uniformly the second organic compound, which is the base of the second organic compound layer 4, and forming a film on the signal patterned surface of a mold for medium manufacturing, which is called a stamper, placing the first organic compound which is the base of the first organic compound layer 3 on top of the second organic compound and pressing the transparent substrate 1 to the first organic compound to expand it to a uniform thickness.

This method has the advantage of being able to improve the recording-reproducing characteristics because it is able to make the thickness of the second organic compound layer uniform, and also it does not change the shape of the preformat pattern, in comparison with the method comprising transferring of the preformat pattern on the single layer of the first organic compound layer, and subsequent spin coating of the second organic compound layer on its patterned surface.

As for the stamper, there are known stampers made of metal or resin, but for reason of better endurance and so on, a stamper made of metal (for example, nickel) is generally used. Also, as for the second organic compound, there are used polymers such as cellulose nitrate, polyvinyl alcohol, polyvinyl alcohol nitride, polytetrafluoroethylene, guanine, and polymers similar to these polymers formed by plasma polymerization.

However, when using the metal stamper and an organic compound comprising the second organic layer 4 which has a large adhesion strength, the exfoliating process has to be done slowly and carefully. Otherwise, it is liable to cause exfoliation at the interface of the first organic compound layer and the second organic compound layer, and it is accordingly difficult to manufacture a good replica with good efficiency. Also, a large exfoliating force is needed to separate the replica from the stamper, therefore inconveniences such as deformation of the transferred preformat pattern or, in the worst case, breakage of the transparent substrate and ripping of the replica layer due to its partial sticking to the stamper, or the like is liable to occur.

SUMMARY OF THE INVENTION

Therefore, the first object of the present invention is to provide a structure of the optical recording medium with good transferring property of the preformat pattern, high productivity and high yield of good quality product.

In order to achieve the first object of the present invention there is:

(1) a transferred layer is formed a three-layer structure, wherein layers composed of a first organic compound layer composed of a first organic compound simple substance, a mixed layer composed of a mixture of the first and a second organic compound, and a second organic compound layer composed of a second organic compound simple substance, layered in the above order from the transparent substrate, in an optical recording medium composed of laminating a recording layer on the top of the preformat pattern formed on the surface of the transferred layer, wherein the transferred layer of the preformat pattern is formed on one side of the transparent substrate;

(2) transferred layer is formed with a single layer of a mixed layer composed of the first and the second organic compound, in the optical recording medium;

(3) the transferred layer is formed in a two-layer structure, with the layers composed of the first organic compound layer composed of the first organic compound simple substance, and the mixed layer composed of a second organic compound and substance which has better exfoliating property toward metal than that which the second organic compound has, layered in the above order from the transparent substrate in the optical recording medium, as mentioned above;

(4) the transferred layer is formed in a four-layer structure with the layers composed of a first organic compound layer composed of a first organic compound simple substance, a mixed layer composed of a mixture of the first and second organic compound, a second organic compound layer composed of a second organic compound simple substance, and an exfoliating substance layer composed of substance which has better exfoliating property toward metal than that which the second organic compound has, layered in the above order from the transparent substrate in the optical recording medium as mentioned above;

(5) the transferred layer is formed in a three-layer structure with the layers composed of a first organic compound layer composed of a first organic compound simple substance, a second organic compound layer composed of a second organic compound simple substance, and an exfoliating substance layer composed of a substance which has better exfoliating property towards metal than that which the second organic compound has, layered in the above order from the transparent substrate, in an optical recording medium made from a laminating recording layer on top of the preformat pattern formed on the surface of the transferred layer, wherein the transferred layer of preformat pattern is formed on one side of the transparent substrate.

Also, in order to achieve the second object, of the present invention:

(1) a mixed layer is formed at the interface of the first organic compound layer and a second organic compound layer and which is composed of first and second organic compounds respectively composing first and second layers, in the process of and the process after expanding by the transparent substrate, the first organic compound being placed on top of the second organic compound layer which is formed on the signal patterned surface of a metal stamper and is composed of a second organic compound single substance, when fabricating a replica, in a method for manufacturing optical recording medium including the process of manufacturing the replica of the signal patterned surface formed on the metal stamper by expanding the organic compound between the metal stamper and the transparent substrate;

(2) a transferred layer composed of a single layer of a mixed layer of first and second organic compounds in between a metal stamper and a transparent substrate is formed by placing the mixture of the first organic compound and second organic compound on a signal patterned surface of the metal stamper and expanding this mixture with the transparent substrate, when fabricating a replica in a method for manufacturing, as mentioned above;

(3) a transferred layer made of a single layer of a mixed layer of first and second organic compound is formed in between a metal stamper and a transparent substrate by penetrating or dissolving the whole of the first organic compound into the second organic compound layer in the process of the the process after expanding with the transparent substrate, the first organic compound being placed on top of the second organic compound layer which is formed on a signal patterned surface of the metal stamper and composed of a second organic compound simple substance, when fabricating a replica in a method for manufacturing, as mentioned above;

(4) a mixed layer of a first organic compound layer is adhered together in the process of and the process after expanding with the transparent substrate, the first organic compound being placed on top of the mixed layer formed on a signal patterned surface of the metal stamper and composed of a second organic compound and substance which has better exfoliating property toward metal than that which the second organic compound has, when fabricating a replica, in a method for manufacturing as mentioned above;

(5) a mixed layer of a first and a second organic compound is formed on the metal stamper by penetrating or dissolving a part of the first organic compound into the second organic compound layer in the process of and the process after expanding with a transparent substrate, the first organic compound being placed on top of the second organic compound layer formed on a signal patterned surface of the metal stamper and composed of the second organic compound simple substance, when fabricating a replica in a method for manufacturing as mentioned above;

(6) expanding a first organic compound which neither dissolves into the second organic compound nor penetrates into the second organic compound on top of the mixture of the second organic compound which has better exfoliating property toward metal than that which the second organic compound has, having been applied uniformly onto the signal patterned surface of a metal stamper, when fabricating a replica in a method for manufacturing, as mentioned above;

(7) a first organic compound layer and a second organic compound layer are adhered together in the process of and the process after expanding with the transparent substrate the first organic compound being placed on top of the second organic compound layer composed of the second organic compound, composed especially of an explosive substance, such as cellulose nitrate, which is formed on top of the substance layer composed of a substance which has better exfoliating property toward metal than that which the second organic compound has, having been applied uniformly on the surface of the signal patterned surface of metal stamper, when fabricating a replica in a method for manufacturing, as mentioned above;

(8) a first organic compound which neither dissolves into the second organic compound nor penetrate into the second organic compound is expanded on top of the second organic compound layer composed of the second organic compound and formed on top of the substance layer composed of substance which has better exfoliating property toward metal than that which the second organic compound has, having been applied uniformly on the signal patterned surface of a metal stamper, when fabricating a replica by a method for manufacturing, as mentioned above.

The numbers in drawings indicate the following;

1. Transparent substrate, 2. Transferred layer, 3. First organic compound layer, 4. Second organic compound layer, 5. Recording layer, 6. Mixed layer, 7. Silane coupling agent layer, 8. Preformat pattern, 9. Mixed layer, 10. Exfoliating substance layer, 11. Metal stamper, 12. Signal patterned surface, and 13. Optical disc single plate

DETAILED DESCRIPTION OF THE INVENTION

Various inconveniences arise in the exfoliation of a replica from a stamper in the prior art which are caused by the fact that the adhesion strength between a first organic compound layer and a second organic compound layer is not sufficiently stronger than that between a second organic compound layer and a stamper.

According to the technique (1) for achieving the first object and the technique (1) for achieving the second object, the mixed layer composed of an organic compound composing a first organic compound layer and a second organic compound layer is formed between the two layers so that various inconveniences due to the exfoliating of the replica from a stamper are prevented because the adhesion strength between the first organic compound layer and the second organic compound layer is remarkably stronger than that realized by simply laminating the two layers.

Also, according to the technique (2) for achieving the first object and techniques (2) and (3) for achieving the second object, the transferred layer of a preformat pattern is formed in a single layer, so that, the various inconveniences due to exfoliating the replica from stamper are prevented because the cracking, starting at the middle of the thickness of the transferred layer, does not occur, unlike the case where the transferred layer is formed in a multi-layer.

Moreover, according to techniques (3) to (5) for achieving the first object and techniques (4) to (8) for achieving the second object, the substance with good exfoliating property is exposed on the surface of the transferred layer (the face which contacts with the recording layer) so that the various inconveniences due to exfoliating replica from the stamper are prevented because the adhesion strength between the stamper and replica is less than that when contacting with the stamper and second organic compound, such as cellulose nitrate.

According to the present invention, it is possible to strengthen sufficiently the adhesion strength between the first organic compound layer and the second organic compound layer, relatively stronger than that between the second organic compound layer and the stamper, so as to improve the productivity and the yield of quality product because the replica could easily be exfoliated from the stamper.

Figure 1:
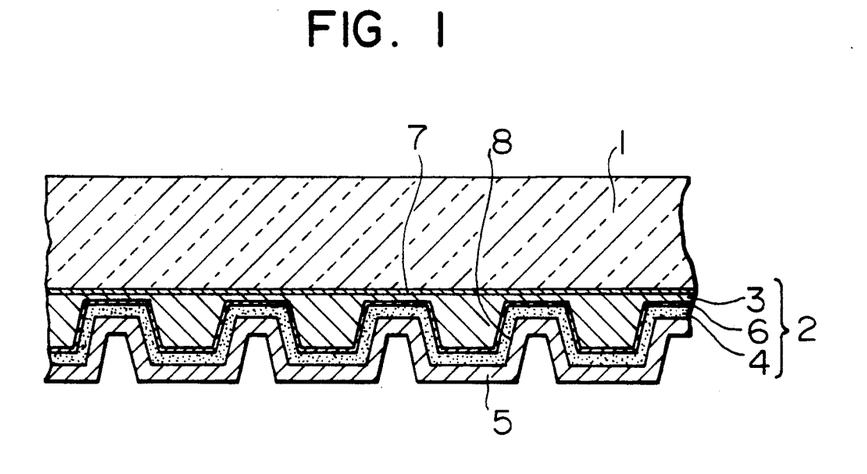
FIG. 1 is a cross-sectional view of the main part of an optical recording medium according to Example 1 of the present invention.

FIG. 1 is an enlarged cross-sectional view of the main part of the optical recording medium according to Example 1 below. There, the transferred layer 2 of the preformat pattern formed on one side of the transparent substrate 1 is formed in a three-layer structure with the layers composed of a first organic compound layer 3 composed of first organic compound simple substance, mixed layer 6 composed of mixture of first and second organic compounds, and second organic compound layer 4, with the recording layer 5 laminated on the surface and composed of a second organic compound simple substance, layered in the above order from the transparent substrate. Also, the transferred layer 2 is adhered to the transparent substrate 1 through a silane coupling agent layer 7.

Transparent substrate 1 is formed in a flat board-like shape with the front side and back side smooth and parallel to each other using transparent material, such as glass or hard resin. It could be shaped in any shape such as a disc or a card, and it could be designed to any size.

Preformat pattern 8 is composed of a pre-pit array such as address-pit, and pre-groove for guiding the optical spot for recording and reproducing. The preformat pattern 8 is, for the transparent substrate with the shape of a disc, formed in a spiral or concentric circle with the center being the spinning center of the transparent substrate and, for the transparent substrate with the shape of a card, formed in a parallel plane.

For the first organic compound, any resin material which dissolves or penetrates a little into the second organic compound and which has moderate viscosity in a pre-curing state could be used, but photo curing resin is preferably used because the workability at curing and the optical characteristics are good. Also, for the photo curing resin, any known photo curing resin could be used. To give water repellence to the first organic compound layer 3 in order to prevent swelling of the layer 3, resin material for forming layer 3, which includes a cyclic ether compound, is preferred. Also, in order to prevent swelling of the first organic compound layer 3 more effectively, a resin base with the hydrophilic group such as a hydroxyl group, which is masked or then substituted to a non-hydrophilic group, could be used.

Now, as the cyclic ether compound, any cyclic ester compound such as tetrahydrofurfuryl acrylate, tetrahydrofurfuryl methacrylate, glycidyl acrylate, glycidyl methacrylate, and derivatives of these could be used.

Also, the percentage content of cyclic ether compound contained in the resin material for forming a layer could be changed freely considering the permeability to the material of the transferred layer, the water repellence of the resin, and the insolubility to the material of the transferred layer, but those adjusted in the range of 5 to 60 wt. % are preferred.

As said second organic compound, substances such as cellulose nitrate, polyvinyl alcohol, polyvinyl alcohol nitrate, polytetrafluoroethylene, guanine, and polymers formed by plasma polymerization, or a substance which uses as a main element at least one kind selected from the group mentioned above could be used. In the case where the second organic compound is used as the underlayer for the recording layer of ablading type, in order to improve the record sensitivity of the recording layer, substances with its formation is adjusted so that it causes thermal deformation such as fusion, vaporization, sublimation, dissolution or explosion in the temperature range of 150° C. or more and the melting point of the recording layer or less could be used. Also, when cellulose nitrate is used as the second organic compound, substances with nitrogen of 11.9 to 12.2 (%), average degree of substitution of 2.1 to 2.3, and the viscosity of 850 to 1000 (sec.) is preferred because it has good applicability towards stamper and has good effect in improving record sensitivity.

As said recording layer 5, any known recording layer such as ablading type (for example, low melting point alloy or organic dye), optical magnetic type (for example, a transition metal and rare earth metal used as a main element) and phase change type (for example, amorphous metal) could be used.

Silane coupling agent layer 7 is formed by printing to transparent substrate 1 γ-methacryloxypropyl-trimethoxy-silane and the like. From now on, the method for manufacturing an optical recording medium according to Example 1 will be explained.

Figure 2A:
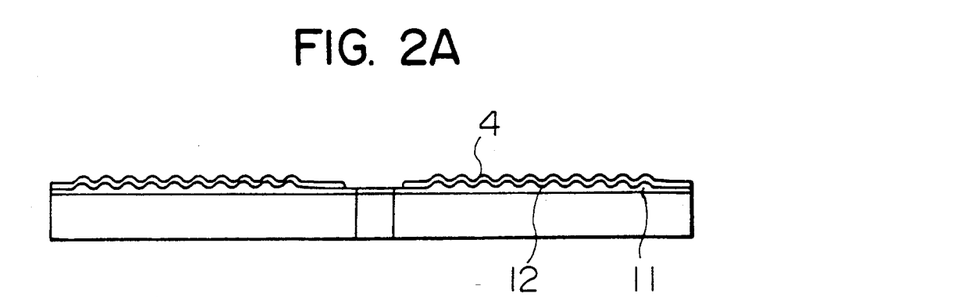
FIG. 2 is a explanatory diagram of a process flowchart of the method for manufacturing the optical recording medium according to Example 1.

First, as shown in FIG. 2(a), the second organic compound is applied uniformly on signal patterned surface 12 of the metal stamper 11. Spin coating is preferred as the means for applying the second organic compound.

Figure 2B:
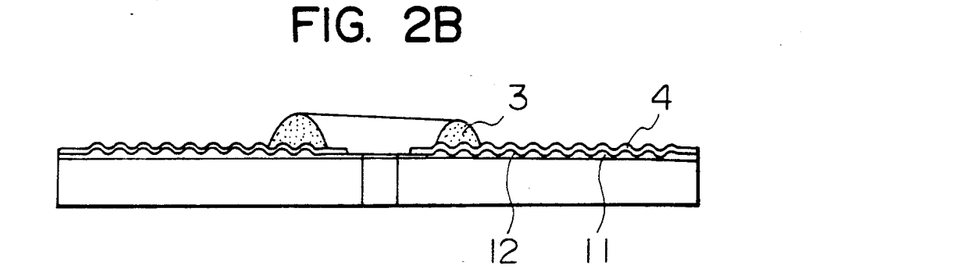
Figure 2C:
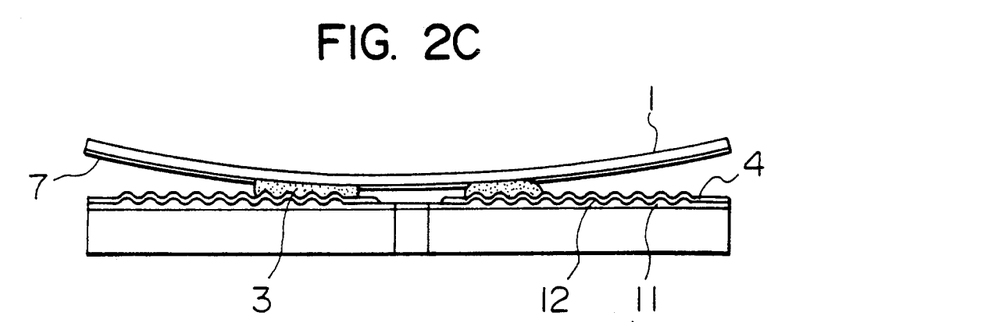

Next, as shown in FIG. 2(b), a first organic compound is placed on one part of the signal patterned surface 12 with a second organic compound applied to it. Then, as shown in FIG. 2(c), silane coupling agent layer 7 is printed to the transparent substrate 1 and the first organic compound is expanded to uniform thickness by pressing transparent substrate 1. In the process of and the process after this, a mixed layer 6 composed of a mixture of the first and second organic compound is formed on the contacting face of the first organic compound layer 3 composed of said first organic compound and the second organic compound layer 4 composed of said organic compound.

Figure 2D:
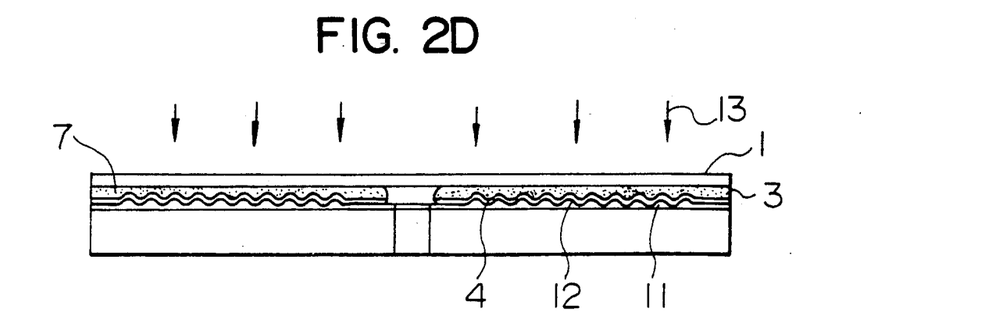

Then, as shown in FIG. 2(d), a desired replica is obtained by first curing the first organic compound and then exfoliating the interface of said metal stamper 11 and said second organic compound layer 4. In this figure, the process of curing the photo curing resin used as the first organic compound by irradiation of resin curing light 13.

Lastly, the optical recording medium shown in FIG. 1 is obtained by laminating recording layer 5 on the surface of said second organic compound layer 4. As for the means for forming the recording layer 5, any known method for forming a thin film such as vacuum vapor deposition, sputtering (for the recording layer of organic dye, spin coating) could be used.

The optical recording medium of the Example mentioned above formed a mixed layer 6, in the middle of first organic compound layer 3 and the second organic compound layer 4, composed of mixture of each organic compound composing the layers so that the adhesion strength between first organic compound layer 3 and second organic compound layer 4 is remarkably stronger than that by simply laminating the two layers, resulting in improvement of the exfoliating property on exfoliating the replica from stamper.

Also, the method for production in the Example could make an optical recording medium with a structure, as shown in FIG. 1, with the same number of man-hours as the prior art so that the cost will not be expensive. This is because mixed layer 6 could be formed in between the layers just by expanding the first organic compound layer 4.

Figure 3:
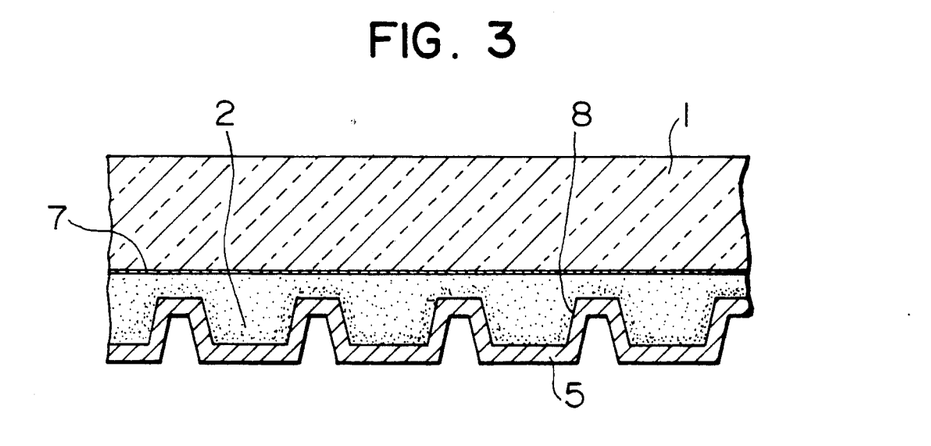
FIG. 3 is a cross-sectional view of the main part of the optical recording medium according to Example 2.

FIG. 3 is an enlarged cross-sectional view of the main part of the optical recording medium according to Example 2. The transferred layer 2 of preformat pattern 8 formed of a single layer of mixed layer composed of a mixture of a first and second organic compound is set on one side of the transparent substrate 1 through silane coupling agent layer 7. The recording layer 5 is laminated on the surface of the transferred layer 2.

The same material given in Example 1 mentioned before could be used for the material composing transparent substrate 1, first and second organic compound and recording material composing recording layer 5. Also, the same composition as in Example 1 mentioned before could be used for shape and arrangement and the like of the transparent substrate 1 and preformat pattern 8.

The mixture rate of the first organic compound layer mixed in the second organic compound could be adjusted freely considering the simplicity of the exfoliation of the replica and the recording sensitivity of the recording layer 5, but to adjust to 5 wt. % -60 wt. % at the face contacting said recording layer 5 is preferred.

The optical recording medium of present Example 2 could be formed by expanding with transparent substrate 1, to a uniform thickness, the mixture of a first and second organic compound placed in a circle on the inner circumferential part of a signal patterned surface of a stamper.

Also, the method of forming the mixed layer of a mixture of a first and second organic compound by penetrating or dissolving the first organic compound to the second organic compound in the process of and the process after expanding to uniform thickness with transparent substrate 1 the first organic compound which has good permeability and solubility to a second organic compound and placed in a circle on the inner circumferential part of a signal patterned surface of a stamper with the second organic compound applied uniformly could be used (see FIG. 2(a)-(c)).

An optical recording medium of Example 2 is formed with transferred layer 2 of preformat pattern with a mixture of the second organic compound and the first organic compound which has better exfoliating property toward metal than that which the second organic compound has (for example, photo curing resin), so it could expose the first organic compound on the surface of the transferred layer. Therefore, it could weaken the adhesion strength between the replica and metal stamper than that in the case where the second organic compound only contacted the signal patterned surface of the metal stamper, resulting in improving the exfoliating property of the replica.

Figure 4:
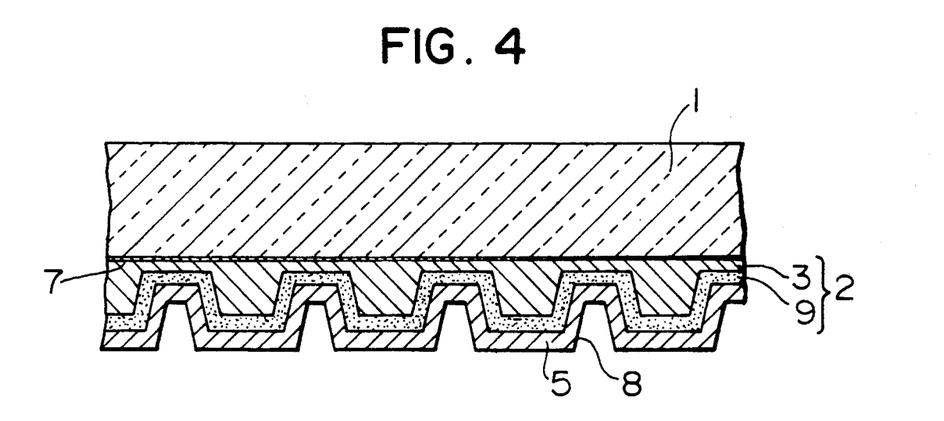
FIG. 4 is a cross-sectional view of the main part of the optical recording medium according to Example 3.

FIG. 4 is an enlarged cross-sectional view of the main part of the optical recording medium according to Example 3. The transferred layer 2 of preformat pattern 8 is composed of a two-layer structure with the layers composed of first organic compound layer 3 composed of a first organic compound simple substance, and a mixed layer 9 composed of a mixture of a second organic compound and substance which has better exfoliating property toward metal than that which the second organic compound has, layered in the above order from the transparent substrate.

For the substance, which has better exfoliating property toward metal than said second organic compound, at least one substance selected from, for example, photo curing resin, fluoro resin, polyamide resin, polyacrylate resin, polyethylene resin, polypropylene resin and vinyl chloride resin and the like could be used.

Also, the same material given in Example 1 mentioned before could be used for material composing transparent substrate 1, first and second organic compound and recording material composing record layer 5, in the present Example. And the same composition as in Example 1 mentioned before could be used for shape and arrangement and the like of the transparent substrate 1 and preformat pattern 8.

The mixture rate of the substance with good exfoliating property mixed in the mixed layer 9 could be adjusted freely considering the simplicity of the exfoliation of the replica and recording sensitivity of the recording layer 5, but the adjustment of about 40 wt. % -95 wt. % at the face contacting thed recording layer 5 is preferred.

The optical recording medium of present Example 3 could be made by expanding to uniform thickness with a transparent substrate first organic compound which has little or no permeability or solubility to the second organic compound and placed in a circle on the inner circumferential part of a signal patterned surface of the stamper where the mixture of first and second organic compound is uniformly applied.

Also, the method of forming the mixed layer of first and second organic compound at least on the face of the transferred layer 2 contacting recording layer 5 by penetrating or dissolving the first organic compound into said second organic compound in the process of and the process after expanding to uniform thickness with transparent substrate 1 the first organic compound which has good permeability or solubility to the second organic compound and which is placed in a circle on an inner circumferential part of signal patterned surface of stamper where second organic compound is uniformly applied could be used (see FIG. 2(a)-(c)).

The optical recording medium of present Example 3 exposed on the surface of the transferred layer 2 substance which has better exfoliating property toward metal than that which the second organic compound has by forming mixed layer 9 composed of the second organic compound and a substance which has better exfoliating property toward metal than that which the second organic compound has, at least on the face of transferred layer 2 contacting the recording layer 5, so that it could have the same effect as the optical recording medium of Example 2 mentioned before.

Figure 5:
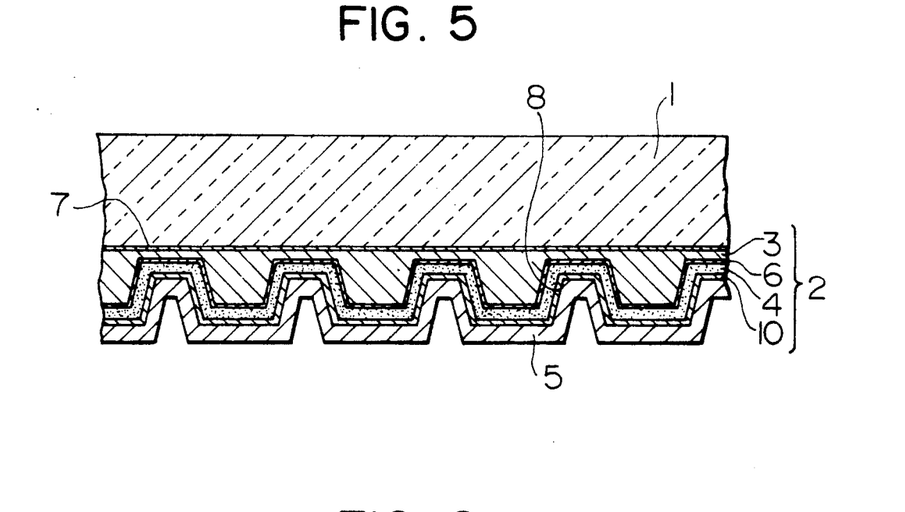
FIG. 5 is a cross-sectional view of the main part of the optical recording medium according to Example 4.

FIG. 5 is an enlarged cross-sectional view of the main part of the optical recording medium according to Example 4. There, the transferred layer 2 of preformat pattern formed on one side of the transparent substrate 1 is composed in a four-layer structure with the layers composed of first organic compound layer 3, composed of a first organic compound simple substance, mixed layer 6 composed of a mixture of the first and second organic compounds, second organic compound layer 4 composed of a second organic compound simple substance, and exfoliating substance layer 10 composed of a substance which has better exfoliating property toward metal than that which the second organic compound has, layered in the above order from the transparent substrate. The recording layer 5 is laminated on the surface of said second organic compound layer 4.

The substances given in Example 3 mentioned before could be used for the substance which has better exfoliating property toward metal than the second organic compound.

Also, the same material given in Example 1 mentioned before could be used for material composing transparent substrate 1, the first and second organic compound, and said recording material composing recording layer 5 of the present Example. The same composition as in Example 1 mentioned before could be used for the shape and arrangement and the like of the transparent substrate 1 and preformat pattern 8.

The exfoliating substance layer 10 could be adjusted freely considering the simplicity of the exfoliation of the replica and the recording sensitivity of the recording layer 5, but the adjustment to about 0.2 nm–50 nm is preferred.

The optical recording medium of present Example 4 could be formed by making a mixed layer 6 composed of a first and a second organic compound on the interface of layers 3 and 4 by penetrating or dissolving the first organic compound into the second organic compound in the process of and the process after expanding to a uniform thickness with the transparent substrate 1, a first organic compound which has some permeability or solubility to a second organic compound and placed in a circle on an inner circumferential part of the signal patterned surface of the stamper. On the signal patterned surface, substance which has better exfoliating property toward metal than that which the second organic compound has is first applied uniformly, then the second organic compound is applied uniformly on top of the substrate layer.

The optical recording medium of Example 3 mentioned before formed an exfoliating substance layer 10 composed of a substance which has better exfoliating property toward metal than that which the second organic compound has on the face of the transferred layer 2 contacting the recording layer 5, so that exfoliation of the replica from the stamper is accomplished with ease. Also, mixed layer 6 was made on the interface of the first organic compound layer 3 and the second organic compound layer 4 so that the layers 3 and 4 are strongly adhered together resulting in preventing the exfoliation at the interface of the first organic compound layer 3 and the second organic compound 4. The synergistic effect of these effects enables the making of a precise replica with good efficiency.

Figure 6:
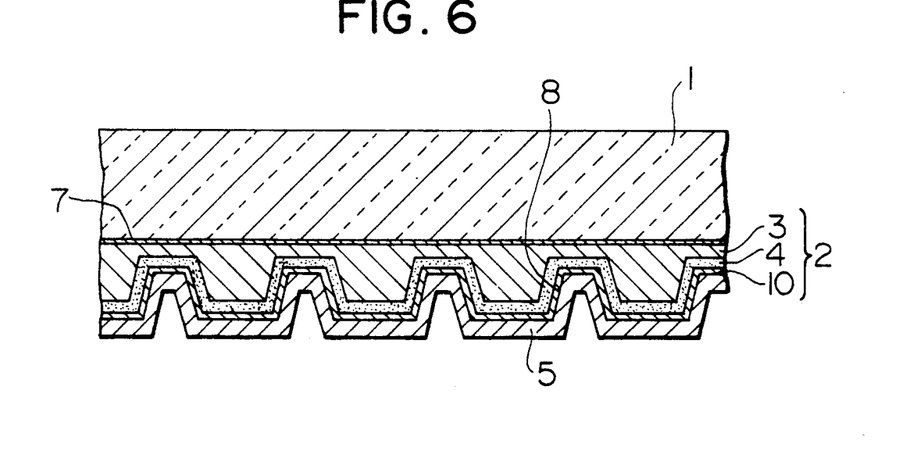
FIG. 6 is a cross-sectional view of the main part of the optical recording medium according to Example 5.

FIG. 6 is an enlarged cross-sectional view of the main portion of the optical recording medium according to Example 5. The transferred layer 2 of the preformat pattern formed on one side of the transparent substrate 1 is composed in a three-layer structure with the layers compound of the first organic compound layer 3 composed of the first organic compound simple substance, the second organic compound layer 4 composed of the second organic compound simple substance, and exfoliating substrate layer 10 composed of a substrate which has better exfoliating property toward metal than that which the second organic compound has, layered in the above order from the transparent substrate. The recording layer 5 is laminated on the surface of the second organic compound layer 4.

The substances given in Examples 3 and 4 mentioned before could be used for the substance which has better exfoliating property toward metal than that which the second organic compound has. Also, the thickness of the exfoliating substance layer 10 composed of the substance could be the same as in Example 4 mentioned before.

The material given in Example 1 mentioned before could be used for material composing the transparent substrate 1, the first and second organic compounds, and the recording material composing recording layer 5 in the present Example. Also, the same composition as is Example 1 mentioned before could be used for the shape and arrangement and the like of the transparent substrate 1 and the preformat pattern 8.

The optical recording medium of the present Example 5 could be obtained by expanding to uniform thickness with the transparent substrate 1 first organic compound which has little or no permeability or solubility to the second organic compound and which is placed in a circle at an inner circumferential part of the signal patterned surface of the stamper. On the signal patterned surface of the stamper, a substance which has better exfoliating property toward metal than that which the second organic compound has, is first applied uniformly, then the second organic compound is applied uniformly on top of the substance layer.

The optical recording medium of the Example 5 formed of an exfoliating substance layer 10 composed of a substance which has better exfoliating property toward metal than that which the second organic compound has, on the face of the transferred layer 2 contacting the recording layer 5, so that replica could be exfoliated with ease from the stamper. Exfoliation at the interface of the first organic compound layer 3 and the second organic compound layer 4 could be prevented, resulting in enabling the making of precise replica with good efficiency.

Figure 7:
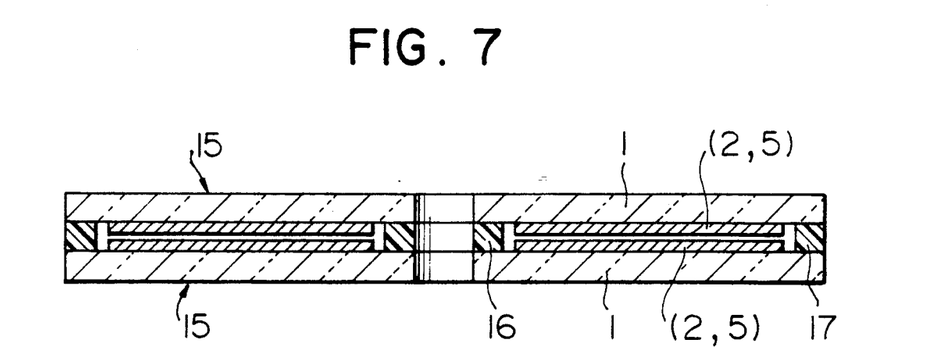
FIG. 7, FIG. 8 and FIG. 9 are cross-sectional views of a practical optical recording medium composed of an optical disc single plate.
Figure 8:
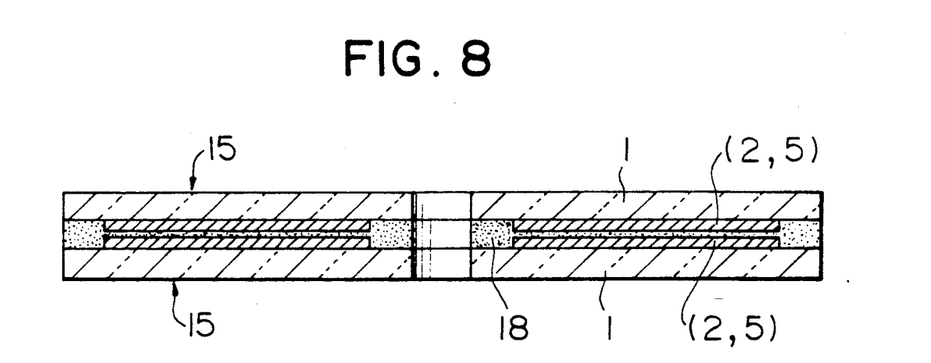
Figure 9:
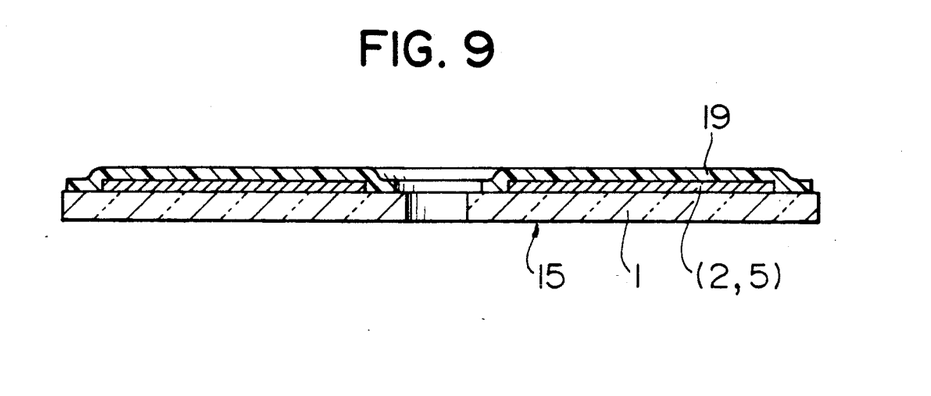

In each example mentioned before we see the structure and the production method for the most basic optical recording medium (hereinafter referred to as an optical disc single plate), but it is possible to make a practical optical recording medium as shown in FIGS. 7-9, using this optical recording medium. In this case, it is possible to laminate different layers needed on the surface of the recording layer 5, such as a protective layer.

The optical disc shown in FIG. 7 is fabricated for a both sides recording type air sandwich structure in which two optical disc single plates 15 are adhered together through an inner circumferential spacer 16 and an outer circumferential spacer 17 with the recording layer 5 sides of the optical disc single plate directed inwardly.

The optical disc shown in FIG. 8 is fabricated on both sides of the recording type closely adhered structure in which the recording layer 5 of two optical disc single plates 15 are directly adhered by an adhesive 18.

The optical disc shown in FIG. 9 is fabricated to a single plate type structure in which a moisture resistant protective layer 19 is coated on the recording layer 5 of an optical disc single plate 15.

In addition to the above cases, an optical disc single plate may be adhered to a protective plate which is not related to the recording of a signal to fabricate a single side recording type optical disc. Further, the optical disc of the air sandwich structure may be fabricated as a sealed type in which an air layer formed between the two optical disc single plates 15 is sealed from the atmosphere when the fabrication of the optical disc is completed and the optical disc may also be fabricated as a ventilated type in which the air layer is in contact with the atmosphere.

EXAMPLES

The advantages of the present invention are mentioned below by indicating more specific examples of optical recording mediums relating to the present invention.

Example 1

Eighteen kinds of mixture, that is, a photo curing resin (STM4, prepared by Dainihon Ink Co.) each including 10 wt. %, 20 wt. %, 30 wt. %, 40 wt. %, 50 wt. %, 60 wt. %, 70 wt. %, 80 wt. %, 90 wt. %, 91 wt. %, 92 wt. %, 93 wt. %, 94 wt. %, 95 wt. %, 96 wt. %, 97 wt. %, 98 wt. %, 99 wt. % of cellulose nitrate was prepared.

Then, one of the mixtures was spin coated in a thickness of about 2000 Å on the signal patterned surface of a nickel stamper, and on top of which was placed a photo curing resin which is impermeable, nor soluble in cellulose nitrate and was extended to a thickness of about 70 μm with a glass substrate.

Then a resin curing light was directed thereon for curing this photo curing resin, and after a replica was produced by exfoliating at the interface of the nickel stamper and the mixture, this replica was treated by baking in the atmosphere. The baking condition was 140° C.×1 hour.

Finally, by sputtering a tellurium-seren-lead type recording layer on the surface of the mixture 13, and by fine crystallizing this recording layer by a baking treatment, an optical recording medium shown in FIG. 4 was obtained. The baking condition here was, in the atmosphere, 80° C.×1 hour.

By the steps mentioned above, 18 kinds of optical recording medium which differ in the content percentage of the cellulose nitrate in the mixture were made.

Example 2

After expanding the photo curing resin in between the nickel stamper and the glass substrate, and by making a replica that does not comprise an underlayer material, a recording layer was laminated directly on the surface of the photo curing resin.

The other conditions were the same as in Example 1.

Example 3

A solvent solution of the cellulose nitrate was spin coated in a thickness of about 2000 Å on the signal patterned surface of the nickel stamper, and after it had dried, a photo curing resin which is impermeable and indissoluble in cellulose nitrate was placed on top of the cellulose nitrate, and a replica was made. And after that, a recording layer was laminated on the surface of the cellulose nitrate layer, and an optical recording medium was obtained.

The other conditions were the same as in Example 1.

Figure 10:
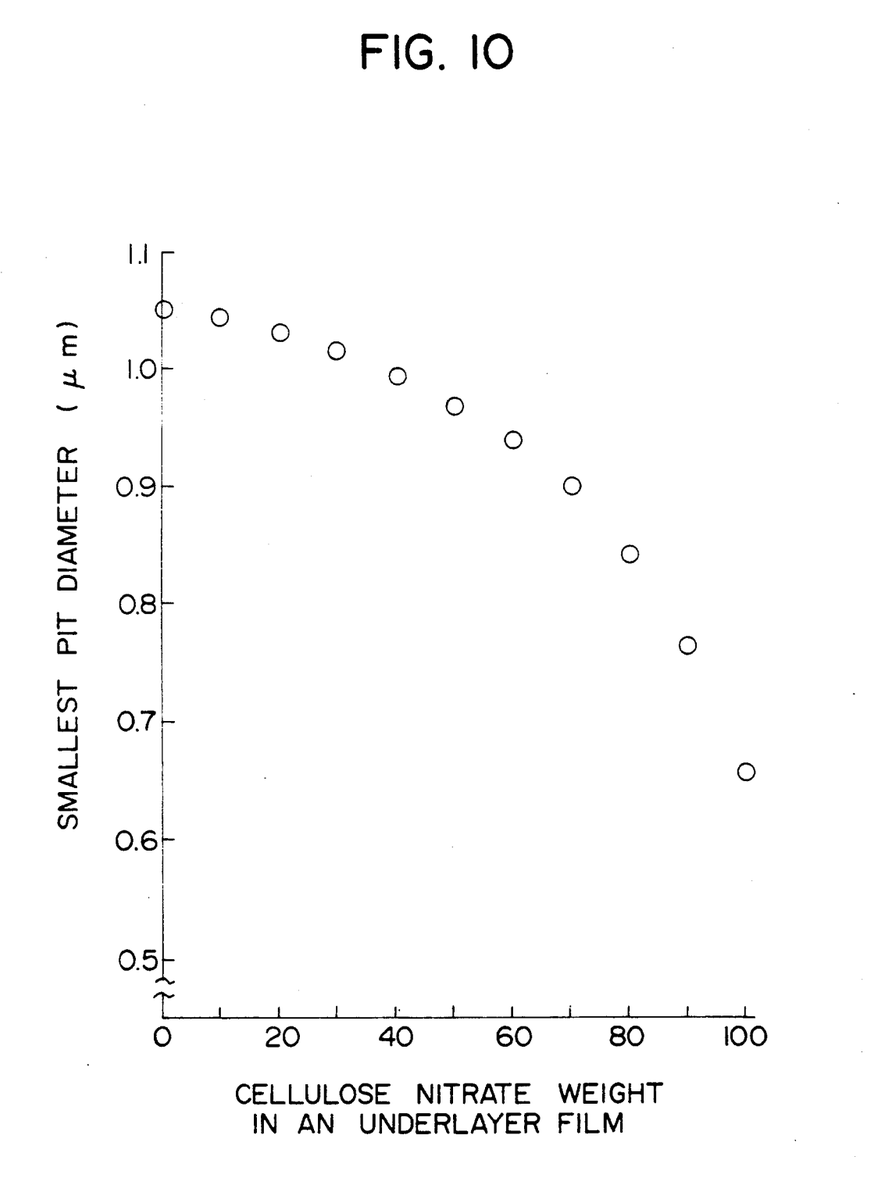
FIG. 10 is a graph showing the relation between the percentage content of cellulose nitrate contained in the mixture layer and the smallest pit diameter capable of being formed on recording layer 5.

The recording sensitivity of the optical recording medium mentioned in each of the Example above is shown in FIG. 10. The recording sensitivity is evaluated by the smallest pit diameter able to be formed on the recording layer.

As shown in the graph, the smallest pit diameter able to be formed on the recording layer could be made smaller by raising the content percentage of the cellulose nitrate in the mixture, so it is advantageous for increasing the density of the record density. At present, one of the most important technical objects of the field of optical recording medium is to increase the density of the recording density, and it is needed for the smallest pit diameter to be smaller than 1.0 μm. From this, it is understood that the content percentage of the cellulose nitrate in the mixture needs to be about 40 wt. % or more.

Figure 11:
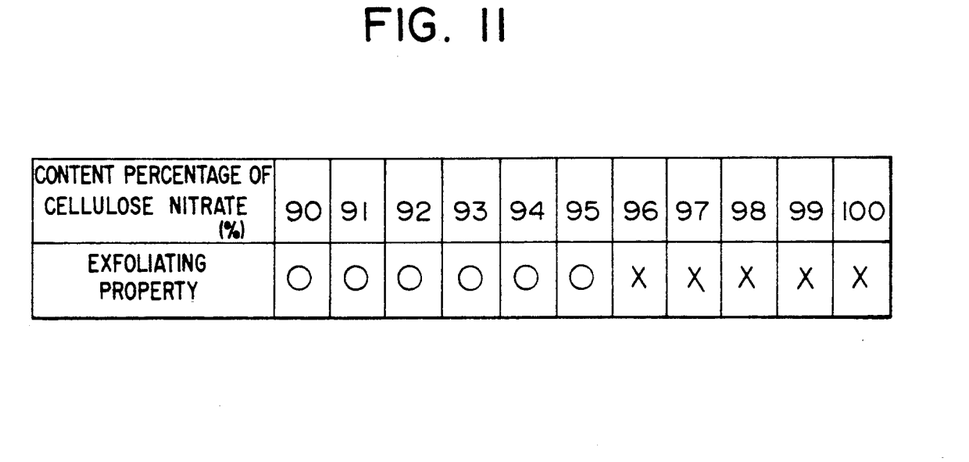
FIG. 11 is a table showing the relation between the percentage content of the cellulose nitrate contained in the mixed layer and the exfoliating property.

The result of the evaluation of the exfoliating property of the replica mentioned in the Examples are shown in FIG. 11. In this figure, an ○ mark indicates that the exfoliating property was good and that the tracking off did not occur during recording action, and the X mark indicates that the exfoliating property was not good and that tracking off occurred during recording action.

As shown in this figure, tracking off occurred when the content percentage of cellulose nitrate in the mixture was 96 wt. % or more and actual recording action was taken, tracking off occurred, so it could be said that the mixture is not suitable for practical use. It is not shown in this figure, but when the content percentage of cellulose nitrate is 0-80 wt. % in the mixture, the exfoliating property was good and tracking off did not occur.

Therefore, from the results of FIG. 10 and 11, it is understood that the content percentage of the cellulose nitrate in the mixture is suitable at 40-95 wt. %, in other words, the content percentage of the photo curing resin to the cellulose nitrate is suitable at 5-60 wt. %.

Figure 12:
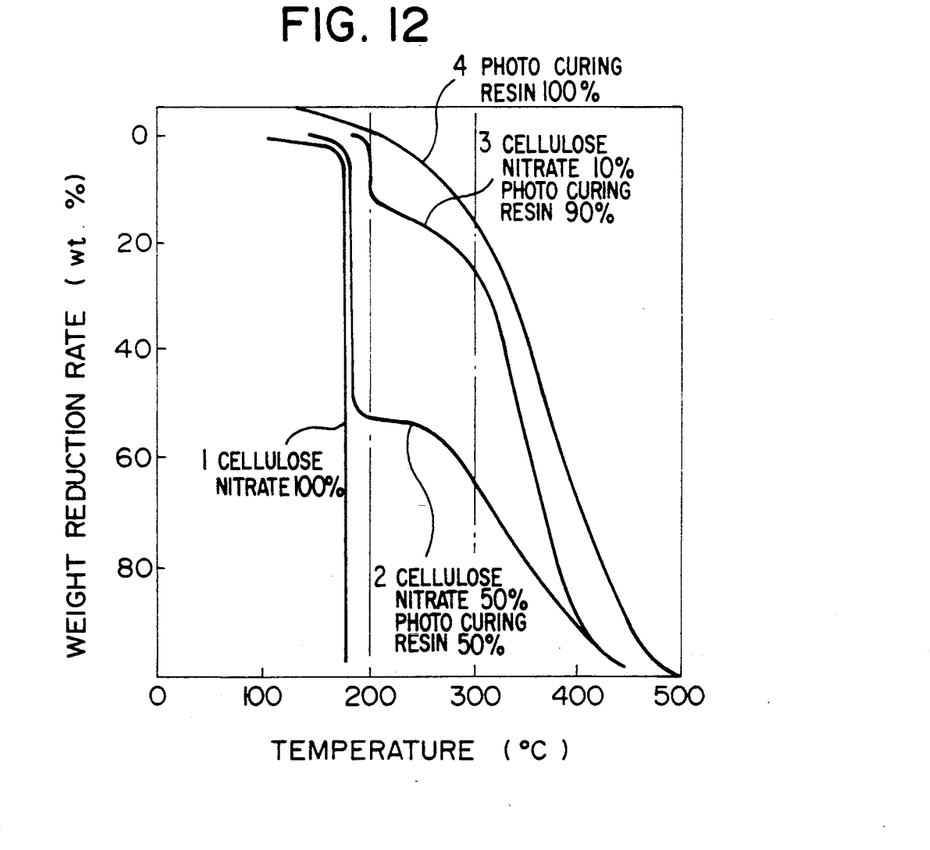
FIG. 12 is a graph for the temperature-deduction characteristics of the cellulose nitrate when the percentage content of the cellulose nitrate contained in the mixed layer is varied.

In FIG. 12, the graph for temperature-weight reduction characteristic of the cellulose nitrate when the content percentage of the cellulose nitrate in the mixture was varied is shown.

As shown in this figure, a pure cellulose nitrate ① rapidly reduces in weight when heated at about 180° C. and promotes, ablading in the recording layer by becoming a gas and applying high pressure to the recording layer. On the other hand, when reducing the content percentage of the cellulose nitrate in the mixture to 50 wt. % (photo curing resin 50 wt. %) ②, to 10 wt. %(photo curing resin 90%) ③, and to 0 wt. % (photo curing resin 100 wt. %) ④, the weight reducing temperature becomes higher, the weight reducing rate becomes smaller, and the gas pressure drops so the effect to promote ablading in the recording layer weakens. Especially when the recording layer is directly laminated on the photo curing resin (the content percentage of the cellulose nitrate is 0 wt. %), a clear starting point of the weight reduction disappears, and the effect of promoting ablading in the recording layer is almost none.

Next, other examples of the optical recording medium according to the present invention will be compared with the optical recording medium according to the examples of the prior art.

The optical recording medium according to each example is obtained by using as a first organic compound a photo curing resin made by mixing a mixture of two or more kinds of organic compounds having the molecular structure formula (A) - (N) mentioned below with the 2-hydroxy -2-methyl-1-phenylpropane-1-on having the molecular structural formula (Q) as a photopolymerization initiator and mixing it until the mixture becomes uniform. Also, as the optical recording medium according to the comparative example, a photo curing resin as a first organic compound is made by using a mixture made by mixing a mixture of an organic compound having the molecular structural formula (A), (0) and (P) with the 2-hydroxy-2-methyl-1-phenylpropane-1-on having the structural formula (Q) as a photopolymerization initiator and mixing it until the mixture becomes uniform. For other condition, the example and the comparative example both followed the manufacturing method shown in FIGS. 2(a)-(d).

Molecular structural formula (A);
TE2000 produced by Nippon Soda Co., Ltd.

(average molecular weight = 2,000)

Molecular structural formula (B);

Molecular structural formula (C);

(n = 14~25)

-continued

Molecular structural fomrula (D);

(n = 14~25)

Molecular structural formula (E);

Molecular structural formula (F);

Molecular structural formula (G);

Molecular structural formula (H);

Molecular structural formula (I);

Molecular structural formula (J);

Molecular structural formula (K);

Molecular structural formula (L);

Molecular structural formula (M);

Molecular structural formula (N);

Molecular structural formula (Q);

Molecular structural formula (O);

Molecular structural formula (P);

-continued $$CH_2=\underset{\underset{CH_3}{|}}{C}COCH_2-OH$$

(with C=O shown)

The composition of the photo curing resin used in each example and comparative example is shown in Table 1. The compounds A-Q in the table are the organic compounds of the molecular structural formula written above.

TABLE 1

| | [wt parts] | | | | | | | | | | | |
|---|---|---|---|---|---|---|---|---|---|---|---|---|
| | Example | | | | | | | | Comparative examples | | | |
| Compound | 4 | 5 | 6 | 7 | 8 | 9 | 10 | 11 | 1 | 2 | 3 | 4 |
| A | 30 | 30 | 20 | 30 | 20 | 30 | 20 | 20 | 20 | 30 | 30 | 50 |
| B | 20 | 20 | 20 | 30 | 20 | 20 | 30 | 20 | 15 | — | 50 | — |
| C | — | — | 10 | — | — | 10 | — | — | — | 30 | — | — |
| D | 45 | — | — | — | — | — | — | — | — | — | — | — |
| E | — | 30 | — | — | — | — | — | — | — | — | — | — |
| F | — | — | 40 | — | — | — | — | — | — | — | — | — |
| G | — | — | — | 5 | — | — | — | — | — | — | — | — |
| H | — | — | — | — | 10 | — | — | — | — | — | — | — |
| I | — | — | — | — | — | 40 | — | — | — | — | — | — |
| G | — | — | — | — | — | — | 20 | — | — | 40 | 20 | — |
| K | 5 | — | — | — | — | — | — | — | — | — | — | — |
| L | — | 20 | — | — | 50 | — | — | 60 | — | — | — | — |
| M | — | — | 10 | — | — | 10 | — | — | 65 | — | — | — |
| N | — | — | — | 35 | — | — | 30 | — | — | — | — | — |
| O | — | — | — | — | — | — | — | — | — | — | — | 20 |
| P | — | — | — | — | — | — | — | — | — | — | — | 30 |
| Q | 2 | 2 | 2 | 2 | 2 | 2 | 2 | 2 | 2 | 2 | 2 | 2 |

The results of the experiments on the optical recording medium according to each example and each comparative example are shown in Table 2. Provided that experiment 1 is an experiment on the water absorbing rate of the first organic compound layer, the water absorbing rate of the first organic compound layer (photo curing resin layer) was measured after immersing the recording single plate in 20° C. water for 7 days. The unit is wt. %.

Experiment 2 is an experiment on tracking noise and after aging the recording single plate under environment conditions of 20° C. in temperature and 50% in relative humidity for 24 hours, it was constructed into an air sandwich structure, and was put through a reproducing device to measure the tracking noise read out from the pre-groove. The unit is %.

Experiment 3 is an experiment on adhesive properties between the transparent substrate and the transferred layer, and after curing the first organic compound contained in the transferred layer expanded between the transparent substrate and the stamper, a straight line cut (cut by a sharp knife) was made from the surface of the transferred layer to the surface of the transparent substrate in an interval of 1 mm, 11 cuts going length and breadth. From 100 gouges made by this method, the number of exfoliated gouges were counted and shown in the Table 2. This experiment is based on the cross hatch adhesion strength test provided in JIS K5400. The unit is Experiment 4 is an experiment on the exfoliating property of the replica, and it was evaluated by observing if there were any problems in the transparent substrate, like a cracks, when the replica was exfoliated from the stamper. The ⊚ mark in the table indicates that there were no problems, and the X mark of indicates that there was cracking. Also, the ◯ mark indicates that there was no cracking, but that the exfoliation was a little difficult.

Experiment 5 is an experiment on the transferring properties of the preformat pattern, and an optical disc constructed into an air sandwich structure was put through a reproducing device to read out the pre-pit signals, to evaluate whether the signal level and the signal wave pattern were normal or not. The ⊚ mark in the table indicates that the signal level and the signal wave pattern were very good, and the X mark indicates that the signal level and the signal wave pattern were not good. Also, the ◯ mark indicates that the signal level and the signal wave pattern were not very good, but they satisfy the performance needed in practical use.

Experiment 6 is an experiment on the uniform thickness properties of the recording layer, and it was evaluated by putting an optical disc constructed into an air sandwich structure through a reproducing device and measuring the dispersion of the reflection light intensity from the optical disc. The ⊚ mark in the table indicates that the uniform thickness property of the recording layer was very good, and the x mark indicates that it was not good. Also, the ◯ mark indicates that the uniform thickness property of the recording layer was not very good, but it satisfies the performance needed in practical use.

TABLE 2

| | Examples | | | | | | | | Comparative examples | | | |
|---|---|---|---|---|---|---|---|---|---|---|---|---|
| | 4 | 5 | 6 | 7 | 8 | 9 | 10 | 11 | 1 | 2 | 3 | 4 |
| Experiment 1 [wt. %] | 0.4 | 0.5 | 0.5 | 0.6 | 0.6 | 0.5 | 0.5 | 0.7 | 1.0 | 0.3 | 0.3 | 3.0 |
| Experiment 2 [%] | <10 | <10 | <10 | <10 | <10 | <10 | <10 | <10 | <15 | <10 | <10 | >30 |
| Experiment 3 [note] | 100 | 100 | 100 | 100 | 100 | 100 | 100 | 100 | 100 | 100 | 0 | 100 |
| Experiment 4 | ⊚ | ⊚ | ⊚ | ⊚ | ⊚ | ⊚ | ⊚ | ⊚ | ⊚ | ◯ | x | ⊚ |
| Experiment 5 | ⊚ | ⊚ | ⊚ | ⊚ | ⊚ | ⊚ | ⊚ | ⊚ | ⊚ | x | ◯ | ⊚ |
| Experiment 6 | ⊚ | ⊚ | ⊚ | ⊚ | ⊚ | ⊚ | ⊚ | ⊚ | x | ⊚ | ◯ | ⊚ |

Note: Number of exfoliated gouges per 100 gouges

As shown in Table 2, the optical disc in the comparative examples 1-4 had at least one failing characteristic either in the water absorbing rate of the first organic compound layer, the tracking noise, the adhesive property between the transparent substrate and the transferred layer, the exfoliating property when making a replica, the transferring property of the preformat pattern, or the uniform thickness property of the recording layer, but on the other hand, the optical discs in the Examples 4-11 excelled in every characteristic.

Also, in these experiments, only the cases when the cellulose nitrate was used as the second organic compound is shown, but it was confirmed that almost the same effect could be made by the other compounds.

In this way, the recording capacity of the optical disc in the present example can be improved by restraining the formation of the dead zone caused by the swelling of the underlayer and the inconvenience in the exfoliating property of the replica.

Also, in figures showing the each example, the recording layer 5 is drawn as a single layer, but it can be a multi-layer structure composed freely of desired thin films.

Also, in the each example, an optical disc is used for explanation, but it could be applied to other variations of optical recording medium such as optical card.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium comprising a transparent substrate, a transferred layer formed on one side of said transparent substrate, said transferred layer having a preformat pattern formed thereon, and a recording layer laminated on said transferred layer, wherein said transferred layer is comprised of a three-layer structure with a first layer comprising a first organic compound, a second intermediate layer comprising a mixture of said first organic compound and a second organic compound, and a third layer comprising said second organic compound, layered in the above order from said transparent substrate, wherein said first organic compound comprises a photocurable resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacryate resin, polyethylene resin, polypropylene resin, and vinyl chloride resin, and said second organic compound is selected from at least one of cellulose nitrate, polyvinyl alcohol, polyvinyl alcohol nitride, polytetrafluoroethylene, guanine and polymers formed by plasma polymerizing.

2. An optical recording medium comprising a transparent substrate, a transferred layer formed on one side of said transparent substrate, said transferred layer having a preformat pattern formed thereon, and a recording layer laminated on said transferred layer, wherein said transferred layer is comprised of a single layer of a mixture of first and second organic compounds, said first organic compound comprising a photocuring resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacrylate resin, polyethylene resin, polypropylene resin, and vinyl chloride resin, and said second organic compound is selected from at least one of cellulose nitrate, polyvinyl alcohol, polyvinyl alcohol nitride, polytetrafluoroethylene, guanine and polymers formed by plasma polymerizing.

3. An optical recording medium comprising a transparent substrate, a transferred layer formed on one side of said transparent substrate, said transferred layer having a preformat pattern formed thereon, and a recording layer laminated on said transferred layer, wherein said transferred layer comprises a two-layer structure with a first layer comprising a first organic compound, and a second layer comprising a mixture of a second organic compound and an exfoliating substance which has a better exfoliating property toward metal than that which said second organic compound has, layered in the above order from said transparent substrate said first organic compound comprising a photocuring resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacrylate resin, polyethylene resin, polypropylene resin, and vinyl chloride resin, said second organic compound being selected from at least one of cellulose nitrate, polyvinyl alcohol, polyvinyl alcohol nitride, polytetrafluoroethylene, guanine and polymers formed by plasma polymerizing, sand said exfoliating substance being selected from at least one of a photocurable resin, fluoro resin, polyamide resin, polyacrylate resin, polyethylene resin, polypropylene resin and vinyl chloride resin.

4. An optical recording medium according to claim 1, further including an exfoliating layer comprising an exfoliating substance which has a better exfoliating property toward metal than that which said second organic compound has, formed on a surface of said transferred layer between said transferred layer and said recording layer, said exfoliating substance being selected from at least one of a photocurable resin, fluoro resin, polyamide resin, polyacrylate resin, polyethylene resin, polypropylene resin and vinyl chloride resin.

5. An optical recording medium comprising a transparent substrate, a transferred layer formed on one side of said transparent substrate, said transferred layer having a preformat pattern formed thereon, and a recording layer laminated on said transferred layer, wherein sad transferred layer is comprised of a three-layer structure with a first layer comprising a first organic compound, a second intermediate layer comprising a second organic compound, and a third exfoliating layer comprising an exfoliating substance which has a better exfoliating property toward metal than that which said second organic compound has, layered in the above order from said transparent substrate, said first organic compound comprising a photocuring resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacrylate resin, polyethylene resin polypropylene resin, and vinyl chloride resin, said second organic compound being selected from at least one of cellulose nitrate, polyvinyl alcohol, polyvinyl alcohol nitride, polytetrafluoroethylene, guanine and polymers formed by plasma polymerizing, and said exfoliating substance being selected from at least one of a photocurable resin, fluoro resin, polyamide resin, polyacrylate resin, polyethylene resin, polypropylene resin and vinyl chloride resin.

6. An optical recording medium according to claim 1-5, wherein said first organic compound is a photocurable resin including a cyclic ether compound.

7. An optical recording medium according to claim 6, wherein said cyclic ether compound is present in said photocurable resin in an amount of from 5-60 wt %.

8. An optical recording medium according to claim 4 or 5, wherein a thickness of said exfoliating substance layer is adjusted to 0.2 nm-50 nm.

9. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal patterned surface of said metal stamper by forming a layer of a second organic compound on said signal patterned surface of said metal stamper, placing a first organic compound on one part of said signal patterned surface with said second organic compound layered thereon, expanding said first organic compound by pressing with said transparent substrate thereby expanding said first organic compound between said metal stamper and said transparent substrate, forming a layer of said first organic compound on said layer of said second organic compound and wherein an intermediate layer of said first organic compound and said second organic compound is formed at an interface of said first organic compound layer and said second organic compound layer, said first organic compound having a better exfoliating property toward metal than does said second organic compound comprising a photocurable resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacrylate resin, polyethylene resin, polypropylene resin, and vinyl chloride resin, and said second organic compound is selected from at least one of cellulose nitrate, polyvinyl alcohol, polyvinyl alcohol nitride, polytetrafluoroethylene, quanine and polymers formed by plasma polymerizing, said resulting configuration of said second organic compound layer, said first organic compound layer and said intermediate layer comprising said transfer layer;

curing said first organic compound layer of said transfer layer;

exfoliating said transfer layer from said metal stamper, together with said transparent substrate; and laminating a recording layer on said second organic compound layer of said transfer layer.

10. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal patterned surface of said metal stamper by placing a mixture of a first organic compound and a second organic compound on said signal patterned surface of said metal stamper, expanding said mixture of said first organic compound and said second organic compound by pressing with said transparent substrate thereby expanding said mixture between said metal stamper and said transparent substrate to form said transfer layer comprised of a single layer of said mixture, said first organic compound comprising a photocurable resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacrylate resin, polyethylene resin, polypropylene resin, and vinyl chloride resin, and said second organic compound is selected from at least one of cellulose nitrate, polyvinyl alcohol, polyvinyl alcohol nitride, polytetrafluoroethylene, quanine and polymers formed by plasma polymerizing, said resulting single layer mixture comprising said transfer layer;

exfoliating said transfer layer from said metal stamper; and laminating a recording layer on said transfer layer.

11. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal patterned surface of said metal stamper by forming a layer of a second organic compound on said signal patterned surface of said metal stamper, placing a first organic compound on top of sad second organic compound layer, expanding said first organic compound by pressing with said transparent substrate thereby expanding said first organic compound between said metal stamper and said transparent substrate forming said transfer layer of a single layer of a mixture of said first and second organic compounds by dissolving the whole of said first organic compound into said second organic compound layer, said first organic compound having a better exfoliating property toward metal than does said second organic compound comprising a photocurable resin selected from at least one of tetrahydrofurfuryl acrylate, tetrahydrofurfuryl methacrylate, glycidly acrylate, glycidyl methacrylate, and their derivatives used as a cyclic ether compound, fluorine resin, polyamide resin, polyacrylate resin, polyethylene resin, polypropylene resin, and vinyl chloride resin, and said second organic compound is selected from at least one of cellulose nitrate, polyvinyl alcohol, polyvinyl alcohol nitride, polytetrafluoroethylene, quanine and polymers formed by plasma polymerizing, single layer mixture comprising said transfer layer;

exfoliating said transfer layer from said metal stamper; and laminating a recording layer on said transfer layer.

12. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal patterned surface of said metal stamper by forming a layer of a mixture of a first organic compound and a second organic compound on said signal patterned surface of said metal stamper, placing a first organic compound on top of said mixture layer, expanding said first organic compound by pressing with said transparent substrate thereby expanding said first organic compound between said metal stamper and said transparent substrate to form said transfer layer of a first organic compound layer adhered to said mixture layer, said mixture layer further including an exfoliating substance which has a better exfoliating property for metal than does said second organic compound, said first organic compound comprising a photocurable resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacrylate resin, polyethylene resin, polypropylene resin, and vinyl chloride resin, said second organic compound being selected from at least one of cellulose nitrate, polyvinyl alcohol, polyvinyl alcohol nitride, polytetrafluoroethylene, quanine and polymers formed by plasma polymerizing, and said exfoliating substance being selected from at least one of a photocurable resin, fluoro resin, polyamide resin, polyacrylate resin, polyethylene resin, polypropylene resin and vinyl chloride resin;

exfoliating said transfer layer from said metal stamper; and laminating a recording layer on said transfer layer.

13. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal patterned surface of said metal stamper by forming a layer of a second organic compound on said signal patterned surface of said metal stamper, placing a first organic compound on top of said second organic compound layer, expanding said first organic compound by pressing with said transparent substrate thereby expanding said first organic compound between said metal stamper and said transparent substrate forming a mixture of said first and second organic compounds by dissolving a part of said first organic compound into said second organic compound layer, said first organic compound comprising a photcurable resin selected from at least one of tetrahydrofurfuryl acrylate, tetrahydrofurfuryl methacrylate, glycidyl acrylate, glycidyl methacrylate, and their derivatives used as a cyclic ether compound, fluorine resin, polyamide resin, polyacryate resin, polyethylene resin, polypropylene resin, and vinyl chloride resin, and said second organic compound is selected from at least one of cellulose nitrate, polyvinyl alcohol, polyvinyl alcohol nitride, polytetrafluoroethylene, quanine and polymers formed by plasma polymerizing;

exfoliating said transfer layer from said metal stamper; and laminating a recording layer on said transfer layer.

14. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal pattern surface of said metal stamper by forming a layer of a mixture of a second organic compound and an exfoliating substance having a better exfoliating property toward metal than does said second organic compound on said signal patterned surface of said metal stamper, placing a first organic compound, which neither dissolves in or penetrates said mixture layer, on top of said mixture layer, expanding said first organic compound by pressing with said transparent substrate thereby expanding said first organic compound between said metal stamper and said transparent substrate to form said transfer layer of a first organic compound layer on said mixture layer, said first organic compound comprising a photocurable resin selected from at least one of tetrahydrofurfuryl acyrlate, tetrahydrofurfuryl methacrylate, glycidyl acrylate, glycidyl methacrylate, and their derivatives used as a cyclic ether compound, fluorine resin, polyamide resin, polyacrylate resin, polyethylene resin, polypropylene resin, and vinyl chloride resin, said second organic compound being selected from at least one of cellulose nitrate, polyvinyl alcohol, polyvinyl alcohol nitride, polytetrafluoroethylene, quanine and polymers formed by plasma polymerizing, and said exfoliating substance being selected from at least one of a photocurable resin, fluoro resin, polyamide resin, polyacrylate resin, polyethylene resin, polypropylene resin and vinyl chloride resin;

exfoliating said transfer layer from said metal stamper; and laminating a recording layer on said transfer layer.

15. A method of manufacturing an optical recording medium including reproducing a replica on a transparent substrate of a signal patterned transfer layer formed on a metal stamper, which comprises:

providing a metal stamper having a signal patterned surface;

forming said transfer layer on said signal patterned surface of said metal stamper by forming a layer of an exfoliating substance on said signal pattern surface of said metal stamper, forming a uniformly applied layer of a second organic compound on said layer of exfoliating substance, placing a first organic compound on top of said second organic compound layer, expanding said first organic compound between said metal stamper and said transparent substrate to form said transfer layer of a first organic compound layer adhered to said second organic compound layer and said exfoliating substance layer, said exfolitating substance having a better exfoliating property for metal than does said second organic compound, said first organic compound comprising a photocurable resin selected from at least one of tetrahydrofurfuryl acrylate, tetrahydrofurfuryl methacrylate, glycidyl acrylate, glydicyl methacrylate, and their derivatives used as a cyclic ether compound, fluorine resin, polyamide resin, polyacrylate resin, polyethylene resin, polypropylene resin, and vinyl chloride resin, said second organic compound being selected from at least one of cellulose nitrate, polyvinyl alcohol, polyvinyl alcohol nitride, polytetrafluoroethylene, quanine and polymers formed by plasma polymerizing, and said exfoliating substance being selected from at least one of a photocurable resin, fluoro resin, polyamide resin, polyacrylate resin, polyethylene resin, polypropylene resin and vinyl chloride resin;

exfoliating said transfer layer from said metal stamper; and laminating a recording layer on said transfer layer.

16. The method of manufacturing an optical recording medium according to claim 15, wherein said first organic compound neither dissolves in or penetrates said second organic compound layer.

* * * * *